(12) United States Patent
Lee et al.

(10) Patent No.: US 11,102,629 B2
(45) Date of Patent: Aug. 24, 2021

(54) V2X MESSAGE COMMUNICATION METHOD PERFORMED BY TERMINAL IN WIRELESS COMMUNICATION SYSTEM, AND TERMINAL USING METHOD

(71) Applicant: LG ELECTRONICS INC., Seoul (KR)

(72) Inventors: Seungmin Lee, Seoul (KR); Youngdae Lee, Seoul (KR); Sangwon Kim, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 179 days.

(21) Appl. No.: 16/083,415

(22) PCT Filed: Mar. 9, 2017

(86) PCT No.: PCT/KR2017/002597
§ 371 (c)(1),
(2) Date: Sep. 7, 2018

(87) PCT Pub. No.: WO2017/155344
PCT Pub. Date: Sep. 14, 2017

(65) Prior Publication Data
US 2019/0158992 A1 May 23, 2019

Related U.S. Application Data

(60) Provisional application No. 62/305,540, filed on Mar. 9, 2016.

(51) Int. Cl.
*H04W 4/40* (2018.01)
*H04W 4/06* (2009.01)
(Continued)

(52) U.S. Cl.
CPC .............. *H04W 4/40* (2018.02); *H04L 1/0003* (2013.01); *H04L 1/0009* (2013.01);
(Continued)

(58) Field of Classification Search
None
See application file for complete search history.

(56) References Cited

U.S. PATENT DOCUMENTS

2012/0099509 A1* 4/2012 Al ........................... H04L 1/007
370/312
2014/0169297 A1 6/2014 Kim et al.
(Continued)

FOREIGN PATENT DOCUMENTS

KR 20120025536 3/2012

OTHER PUBLICATIONS

PCT International Application No. PCT/KR2017/002597, International Search Report dated Jun. 15, 2017, 4 pages.
(Continued)

*Primary Examiner* — Jeffrey M Rutkowski
*Assistant Examiner* — Basil Ma
(74) *Attorney, Agent, or Firm* — Lee Hong Degerman Kang Waimey

(57) ABSTRACT

Provided are a vehicle-to-everything (V2X) message communication method performed by a terminal in a wireless communication system, and a device using the method. The method simultaneously receives link adaptation parameters for each of a plurality of cell groups, and receives a V2X message from each of the plurality of cell groups by applying the corresponding link adaptation parameters.

11 Claims, 19 Drawing Sheets

(51) Int. Cl.
*H04L 1/00* (2006.01)
*H04W 4/44* (2018.01)
*H04W 28/02* (2009.01)

(52) U.S. Cl.
CPC ............ *H04L 1/0021* (2013.01); *H04W 4/06* (2013.01); *H04W 4/44* (2018.02); *H04W 28/0205* (2013.01); *H04W 28/0226* (2013.01)

(56) References Cited

U.S. PATENT DOCUMENTS

| | | | |
|---|---|---|---|
| 2015/0208401 A1 | 7/2015 | Lu et al. | |
| 2015/0312071 A1 | 10/2015 | Chen et al. | |
| 2017/0325277 A1* | 11/2017 | Fujishiro | H04W 4/06 |
| 2018/0035340 A1* | 2/2018 | Fujishiro | H04W 36/0007 |
| 2018/0227726 A1* | 8/2018 | Futaki | H04W 4/46 |
| 2020/0007247 A1* | 1/2020 | Gulati | H04L 1/0009 |
| 2020/0092685 A1* | 3/2020 | Fehrenbach | H04B 7/2606 |

OTHER PUBLICATIONS

Sony, "Location based resource selection on LTE sidelink for V2V services," 3GPP TSG-RAN WG1 #84, R1-160678, Feb. 2016, 5 pages.

* cited by examiner

| Information regarding the number (P) of cell groups (MBSFN areas) to which cell of V-UE#K belongs |
|---|
| Link adaptation parameter#1 (Link adaptation parameter of cell group #1 (or MBSFN area #1)) |
| Link adaptation parameter#2 (Link adaptation parameter of cell group #2 (or MBSFN area #2)) |
| ... |
| Link adaptation parameter#(P-1) (Link adaptation parameter of cell group # (P-1) (or MBSFN area # (P-1))) |
| Link adaptation parameter#P (Link adaptation parameter of cell group #P (or MBSFN area #P)) |

V2X MESSAGE COMMUNICATION METHOD PERFORMED BY TERMINAL IN WIRELESS COMMUNICATION SYSTEM, AND TERMINAL USING METHOD

CROSS-REFERENCE TO RELATED APPLICATIONS

This application is the National Stage filing under 35 U.S.C. 371 of International Application No. PCT/KR2017/002597, filed on Mar. 9, 2017, which claims the benefit of U.S. Provisional Application No. 62/305,540, filed on Mar. 9, 2016, the contents of which are all hereby incorporated by reference herein in their entireties.

BACKGROUND OF THE INVENTION

Field of The Invention

The present invention relates to wireless communication and, more particularly, to a V2X message communication method performed by a terminal in a wireless communication system and a terminal using the method.

Related Art

In International Telecommunication Union Radio communication sector (ITU-R), a standardization task for International Mobile Telecommunication (IMT)-Advanced, that is, the next-generation mobile communication system since the third generation, is in progress. IMT-Advanced sets its goal to support Internet Protocol (IP)-based multimedia services at a data transfer rate of 1 Gbps in the stop and slow-speed moving state and of 100 Mbps in the fast-speed moving state.

For example, $3^{rd}$ Generation Partnership Project (3GPP) is a system standard to satisfy the requirements of IMT-Advanced and is preparing for LTE-Advanced improved from Long Term Evolution (LTE) based on Orthogonal Frequency Division Multiple Access (OFDMA)/Single Carrier-Frequency Division Multiple Access (SC-FDMA) transmission schemes. LTE-Advanced is one of strong candidates for IMT-Advanced.

There is a growing interest in a Device-to-Device (D22) technology in which devices perform direct communication. In particular, D2D has been in the spotlight as a communication technology for a public safety network. A commercial communication network is rapidly changing to LTE, but the current public safety network is basically based on the 2G technology in terms of a collision problem with existing communication standards and a cost. Such a technology gap and a need for improved services are leading to efforts to improve the public safety network.

The public safety network has higher service requirements (reliability and security) than the commercial communication network. In particular, if coverage of cellular communication is not affected or available, the public safety network also requires direct communication between devices, that is, D2D operation.

D2D operation may have various advantages in that it is communication between devices in proximity. For example, D2D UE has a high transfer rate and a low delay and may perform data communication. Furthermore, in D2D operation, traffic concentrated on a base station can be distributed. If D2D UE plays the role of a relay, it may also play the role of extending coverage of a base station.

The D2D communication described above may extend to be applied to transmission and reception of signals between vehicles, and communication related to vehicles is specifically termed vehicle-to-everything (V2X) communication.

In V2X, the alphabet 'X' indicates a pedestrian (Here, V2X may be represented by V2P), a vehicle (Here, V2X may be represented by V2V), an infrastructure/network (Here, V2X may be represented by V2I or V2N), or the like.

A (V2P communication-related) device carried by a pedestrian (or a person) will be referred to as a "P-UE" and a (V2X communication-related) device installed in a vehicle will be referred to as a "V-UE". In the present disclosure, "entity" may be interpreted as at least one of "P-UE", "V-UE", and RSU (/network/infrastructure).

Meanwhile, V2X communication may be performed in the conventional multimedia broadcast/multicast service (MBMS) manner. The MBMS may refer to a service for simultaneously transmitting the same data to a plurality of users. For example, after a V-UE transmits a V2X message to a first base station (BS) and the first BS transmits the V2X message to another BS or relay station (RS) connected thereto by a backhaul, the first BS and the other BS (or the RS) may transmit the V2X message to a P-UE or another V-UE.

Meanwhile, when a V2X message is transmitted in the MBMS mode, a group of base stations (cells) participating in the MBMS may be changed over time. For example, at a first time point, a first cell group may transmit a V2X message in the MBMS mode, and at a second time point, a second cell group may transmit a V2X message in the MBMS mode. In this case, in the related art MBMS, since a link adaptation parameter, e.g., a modulation and coding scheme for an MBMS message, frequency allocation information, or the like, is changed through a multicast control channel (MCCH) modification period/no/notification mechanism, and thus, it is difficult to dynamically change the V2X message transmission-related link adaptation parameter according to a time varying link quality/interference level and a V2X traffic load.

There is a need for a method and apparatus that may solve this problem.

SUMMARY OF THE INVENTION

The present invention provides a V2X message communication method performed by a terminal in a wireless communication system and a terminal using the same.

In one aspect, provided is a vehicle-to-everything (V2X) message communication method performed by a user equipment (UE) in a wireless communication system. The method includes simultaneously receiving link adaptation parameters regarding each of a plurality of cell groups and receiving a V2X message by applying a corresponding link adaptation parameter from each of the plurality of cell groups.

A link adaptation parameter regarding one of the plurality of cell groups may include at least one of modulation and coding scheme (MCS) information and frequency resource information of a V2X message transmitted from the one cell group.

The link adaptation parameter may be received through a predetermined downlink control information (DCI) format.

The DCI format may be received through a predetermined search space among a common search space (CSS) and a UE-specific search space (USS).

The DCI format may be decoded based on a predetermined radio network temporary identifier (RNTI).

The DCI format may include a field indicating the number of the plurality of cell groups.

The DCI format may include at least one of a field indicating an identity (ID) of a cell group, a field indicating an MCS regarding a V2X message transmitted from a cell group indicated by the ID, and information indicating a frequency resource to which the V2X message is allocated, regarding each of the plurality of cell groups.

The link adaptation parameter may be received through a data channel scheduled by a predetermined downlink control information (DCI) format.

When the plurality of cell groups include a first cell group and a second cell group, a V2X message may be received from the first cell group in a first subframe and a V2X message is received from the second cell group in a second sub-frame as a next subframe of the first subframe.

The V2X message received from the first cell group may be decoded by a first MCS, and the V2X message received from the second cell group is decoded by a second MCS.

The first MCS may be indicated through the link adaptation parameter regarding the first cell group, and the second MCS may be indicated through the link adaptation parameter regarding the second cell group.

The link adaptation parameter may be included in a medium access control (MAC) control element (CE) and received, and the MAC CE may be received through a data channel scheduled by a specific downlink control information (DCI) format.

In another aspect, provided is a user equipment (UE). The UE includes a radio frequency (RF) unit transmitting and receiving a radio signal and a processor combined with the RF unit to operate. The processor simultaneously receives link adaptation parameters regarding each of a plurality of cell groups and receives a V2X message by applying a corresponding link adaptation parameter from each of the plurality of cell groups.

According to the present invention, a user equipment (UE) may receive link adaptation parameters regarding cell groups to be monitored by the terminal at a time, and apply a corresponding link adaptation parameter to cell group to be monitored which is varied over time. Thus, the link adaptation parameter determined according to a link quality/interference level or V2X traffic load of each cell group may be applied to the corresponding cell group without time delay.

BRIEF DESCRIPTION OF THE DRAWINGS

FIG. 18 is an example of a PDCCH/DCI decoded based on the V2X-RNTI or a field/information configuration on the PDCCH/DCI decoded based on the V2X-RNTI.

DESCRIPTION OF EXEMPLARY EMBODIMENTS

Figure 1:
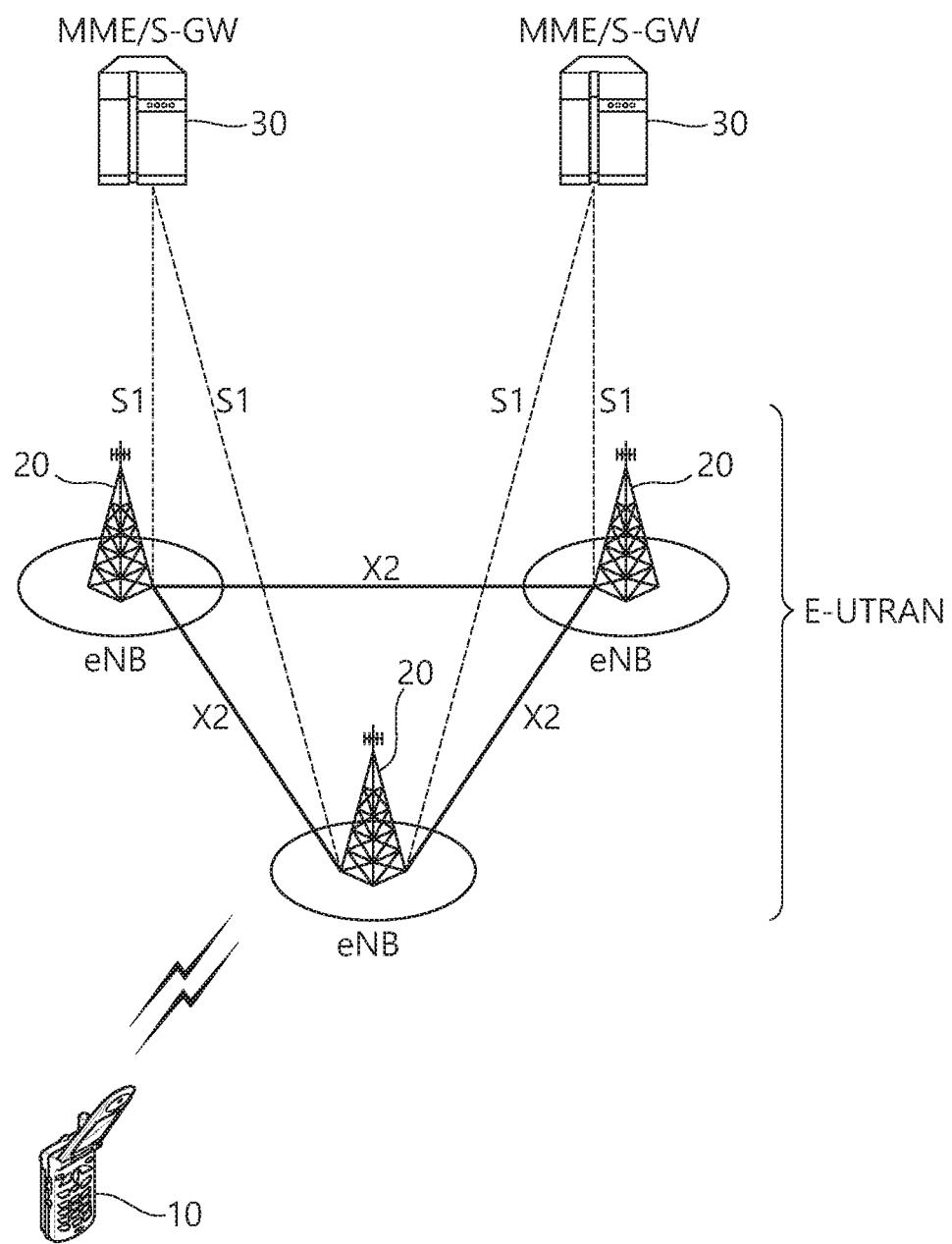
FIG. 1 illustrates a wireless communication system to which the present invention may be applied.

FIG. 1 illustrates a wireless communication system to which the present invention may be applied. The wireless communication system may also be referred to as evolved-UMTS terrestrial radio access network (E-UTRAN) or long term evolution (LTE)/LTE-A system.

The E-UTRAN includes at least one base station (BS) 20 which provides a control plane and a user plane to a user equipment (UE) 10. The UE 10 may be fixed or mobile and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
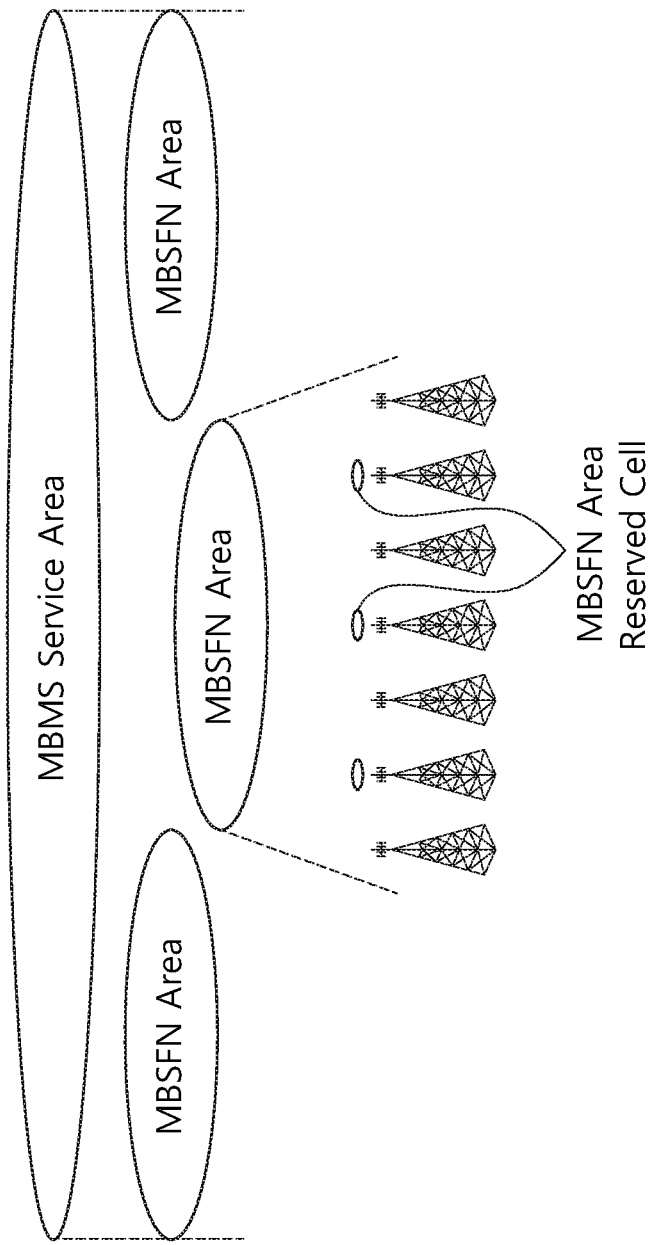
FIG. 2 illustrates a multimedia broadcast/multicast service (MBMS).

FIG. 2 illustrates a multimedia broadcast/multicast service (MBMS).

MBMS is a communication technique allowing one transmitter to transmit the same data to a plurality of receivers. The MBMS may be used to provide a broadcast service using a cellular network.

A single frequency network (SFN) refers to a network in which different transmitters simultaneously transmit the same data via the same frequency. An MBNS single frequency network (MBSFN) refers to that different BSs simultaneously transmit the same data to provide the MBMS service.

An MBSFN synchronization region refers to an area of a network where all BSs may be synchronized and may perform MBSFN transmission. The MBSFN synchronization region may support one or more MBSFN areas. In a given frequency layer, one base station may be included in only one MBSFN synchronization region.

MBSFN transmission or transmission in MBSFN mode: The same waveform may be simultaneously transmitted from a plurality of cells, and MBSFN transmission from a plurality of cells in the MBSFN area may be seen as a single transmission to a UE.

The MBSFN area includes a group of cells within the MBSFN synchronization region of a network and may be cells cooperating to perform MBSFN transmission. Cells in the MBSFN area, except for the MBSFN area reserved cell, contribute to the MBSFN transmission. That is, the MBSFN area may refer to a set of cells providing the same MBSFN service.

MBSFN area reserved cell refers to a cell in the MBSFN area, which does not contribute to MBSFN transmission. This cell may be allowed for transmission for other services, but allowed for only limited transmission power in a resource allocated for MBSFN transmission.

A synchronization sequence is used for the MBMS service, and a synchronization period for indicating a start time of the synchronization sequence may be defined.

In the E-UTRAN, the MBMS may be provided in a single frequency network mode, i.e., in the MBSFN. When the MBMS is provided through the MBSFN, the MBMS may be provided through the MBSFN in a frequency band that shares non-MBMS services, that is, in a set of cells supporting both unicast and MBMS transmission (MBMS/Unicast-mixed cells). The MBMS may be received in an RRC-connected state or an RRC idle state of the UE.

Hereinafter, enhanced MBMS refers to an eMBMS or E-MBMS, and means an advanced MBMS. The E-MBMS may operate in an LTE/LTE-A network.

Figure 3:
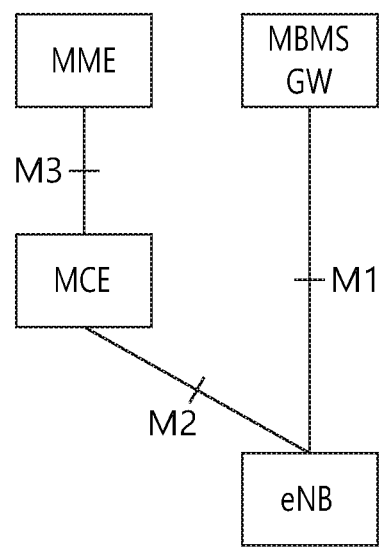
FIG. 3 illustrates an E-MBMS logical structure.

FIG. 3 illustrates an E-MBMS logical structure.

Referring to FIG. 3, a multi-cell/multicast coordination entity (MCE), which is a logical entity, may perform the following functions. Allocation of radio resources used by all BSs in the MBSFN area, admission control, counting and obtaining of counting results for an MBMS service, resumption/stop of an MBMS session, and the like.

MBMS gateway (MBMS GW).

The MBMS gateway is a logical entity which exists between a broadcast-multicast service center (BMSC) (or BM-SC) and a base station (eNB) and a major function thereof is to transmit/broadcast MBMS packets to each BS which transmits a service.

An M3 interface is used between the MCE and a mobility management entity (MME). An M2 interface is used between the MCE and the base station (eNB). An M1 interface is used between the MBMS gateway and the BS.

Figure 4:
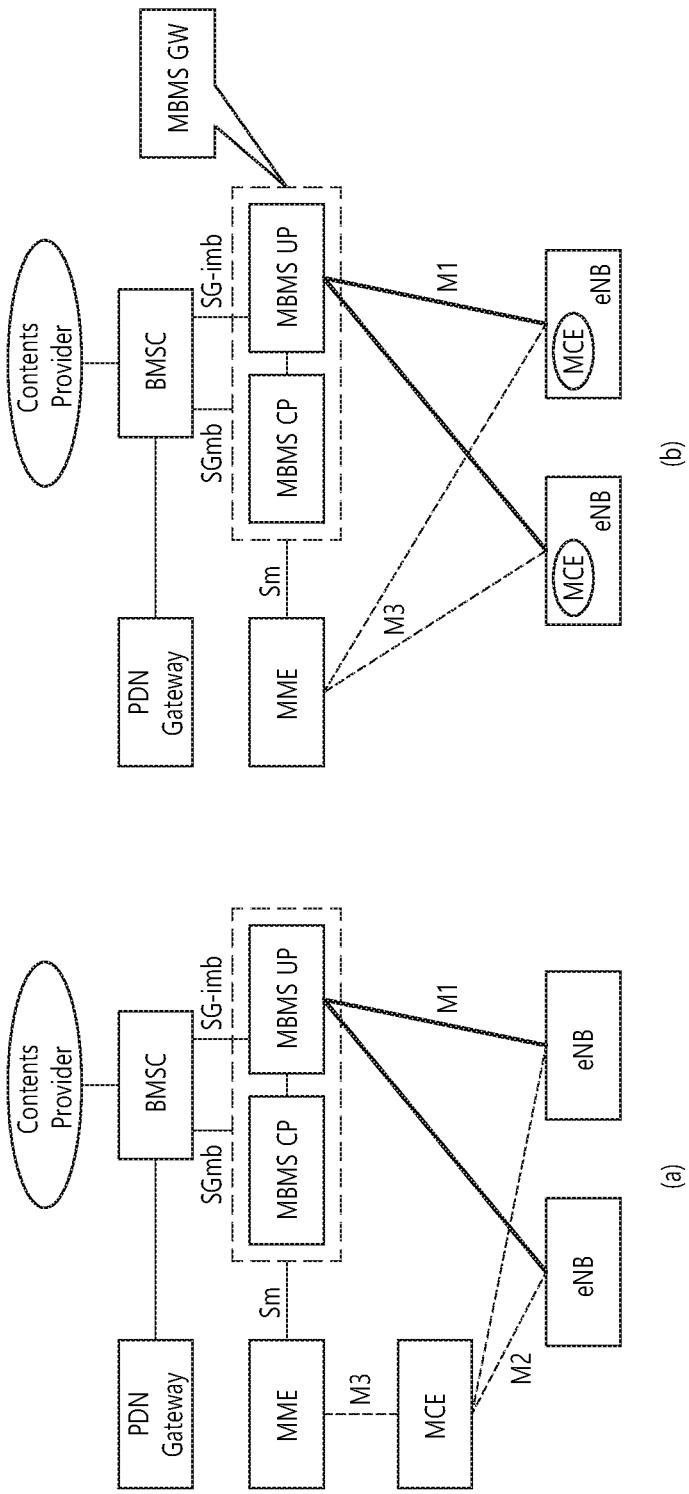
FIG. 4 illustrates an MCE structure.

FIG. 4 illustrates an MCE structure.

FIG. 4A illustrates a centralized MCE architecture, and an MCE is a logical entity. That is, in the centralized MCE architecture, the MCE may be disposed as a single physical entity or may be combined with other physical entities so as to be arranged. The M2 interface is maintained between all base stations corresponding to the MCE and MBSFN areas.

FIG. 4B illustrates a distributed MCE architecture, which is different from the central MCE architecture in that the MCE is part of a BS. The M2 interface between the MCE and the base station must be maintained.

Figure 5:
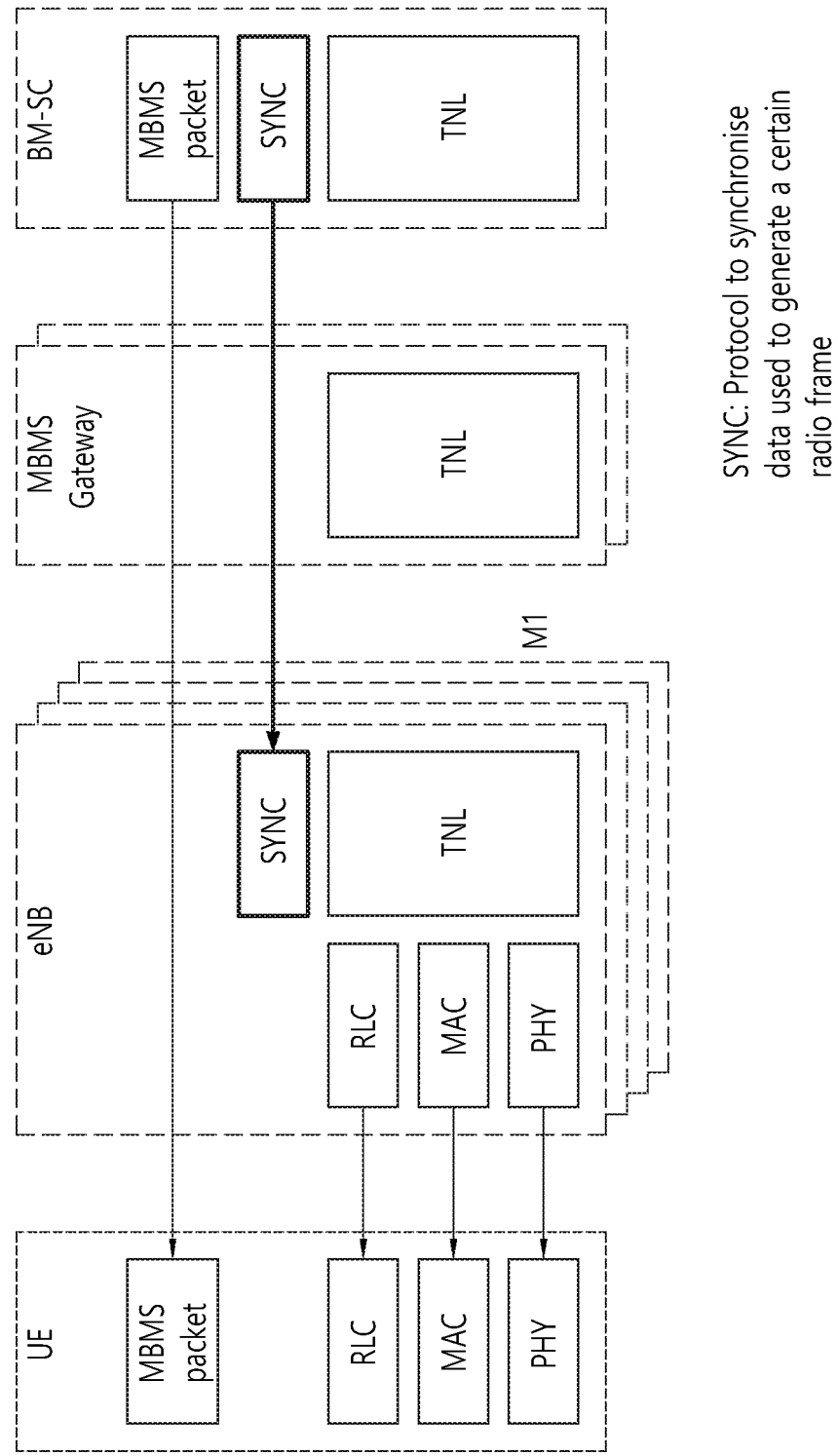
FIG. 5 illustrates an E-MBMS user plane structure.

FIG. 5 illustrates an E-MBMS user plane structure.

Referring to FIG. 5, a synchronization (SYNC) protocol is defined between a BM-SC and a BS. The synchronization protocol is a protocol providing additional information for the BS to identify a timing for wireless frame transmission and detect packet loss. All E-MBMS services use their own synchronization entity. RLC, MAC, and PHY layers are defined between the BS and the UE.

Figure 6:
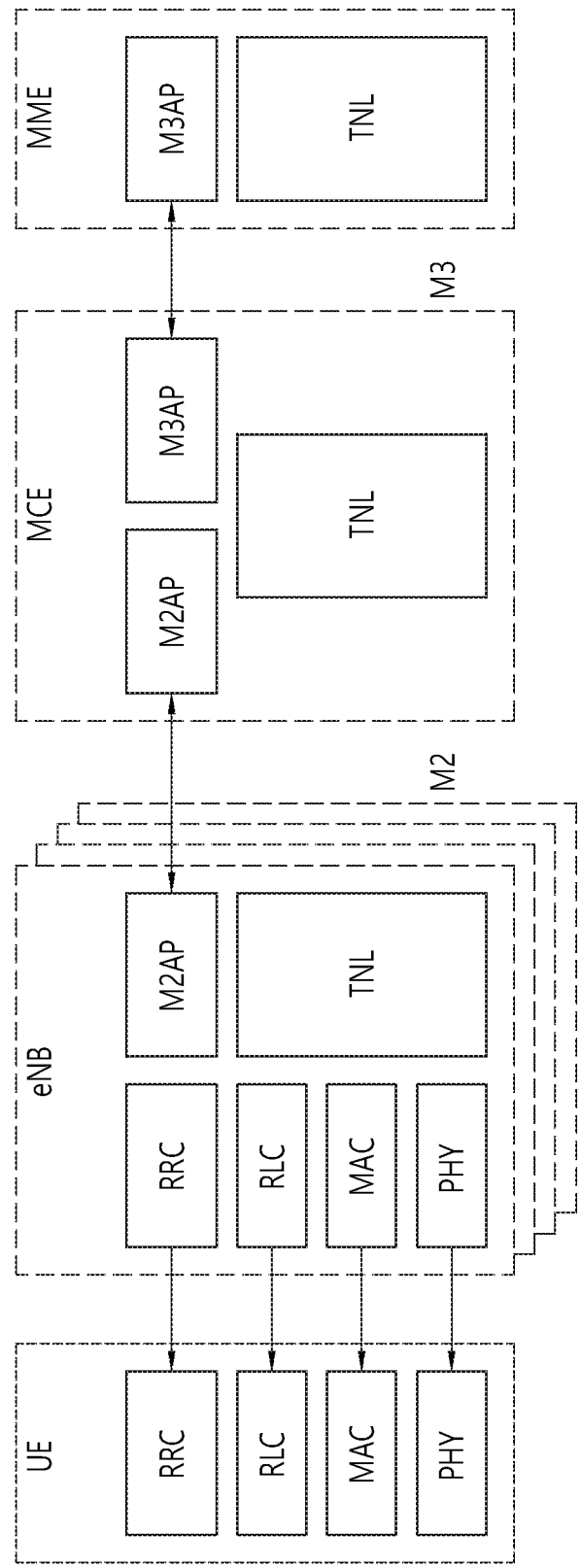
FIG. 6 illustrates an E-MBMS control plane structure.

FIG. 6 illustrates an E-MBMS control plane structure.

Referring to FIG. 6, RRC, RLC, MAC, and PHY layers are defined between a BS and a UE. The M2 interface is used between the BS and the MCE, and the M3 interface is used between the MCE and the MME.

A plurality of MBMS services may be mapped to the same multicast channel (MCH). One MCH may include data belonging to one MBSFN area. One MBSFN area may include one or more MCHs. An MCH-specific MCS may be used in all subframes of the MCH that does not use the MCS indicated in a broadcast control channel (BCCH). All MCHs have the same coverage area.

When a cell change occurs between cells in the same MBSFN area, the UE does not perform radio link control (RLC) re-establishment on a multicast control channel (MCCH) and a multicast traffic channel (MTCH). In MBSFN subframes, all MCHs in the same MBSFN area occupy one subframe pattern and the one subframe pattern is referred to as a common subframe allocation (CSA) pattern. The CSA pattern is periodically repeated with a CSA period. By the CSA pattern, actual MCH subframe allocation is defined for each MCH carrying the MTCH. MCH scheduling information (MSI) is provided for each MCH to indicate which subframe is used by each MTCH.

All BSs in the MBSFN synchronization area have a synchronized radio frame timing so that radio frames are simultaneously transmitted and have the same system frame number (SFN).

Since all the BSs have the same RLC/MAC/PHY configuration for each MBMS service and have the same information, synchronized MCH scheduling is guaranteed in the BSs.

The E-MBMS gateway transmits/broadcasts an MBMS packet using a synchronization (SYNC) protocol to each BS which transmits a service The synchronization protocol provides additional information to allow the BSs to identify the transmitted radio frame.

The BS buffers the MBMS packet and waits until a transmission timing indicated by the synchronization protocol.

It may be necessary to segment/connect the MBMS packet. The synchronization protocol may provide a means for detecting packet loss and may support a recovery mechanism for the loss of contiguous PDU packets.

The UE may receive MTCH transmission in the RRC idle state or the RRC connected state.

The following principles may be applied to the MCCH.

One MBSFN area is associated with one MCCH, and one MCCH corresponds to one MBSFN area.

The MCCH is transmitted through the MCH.

The MCCH may include one MBSFN area configuration RRC message, and the RRC message may include currently ongoing sessions and MBMS services. The MCCH may be transmitted by all the cells in the MBSFN area, excluding the MBSFN area reserved cell. The MCCH is transmitted by the RRC every MCCH repetition period.

The MCCH uses a modification period, and a notification mechanism may be used to notify a change of the MCCH due to start of a session or the presence of an MBMS counting request message. That is, in the MBSFM subframes configured for notification, a notification is periodically transmitted during the modification period prior to the change of the MCCH. A DCI format 1C having an MBMS radio network temporary identity (M-RNTI) may be used for notification, and the MCCH may include an 8-bit bitmap to indicate one or more changed MBSFN areas.

The UE monitors two or more notification sub-frames at the modification period. When the UE receives the notification, it acquires the MCCH at a next modification period boundary. The UE may detect a change regarding the MCCH which is not known by the notification mechanism, through MCCH monitoring at the modification period.

For each MCCH, the BCCH may independently indicate information such as scheduling of the MCCH for multi-cell transmission in the MCH, a MCCH modification period, a repetition period radio frame offset and subframe allocation, an MCS regarding a subframe indicated for MCCH scheduling, and the like. For all the MCCHs commonly used in the notification, the BCCH may set a position of a MCCH change notification subframe, the number of cases monitored by the UE, and the like.

Figure 7:
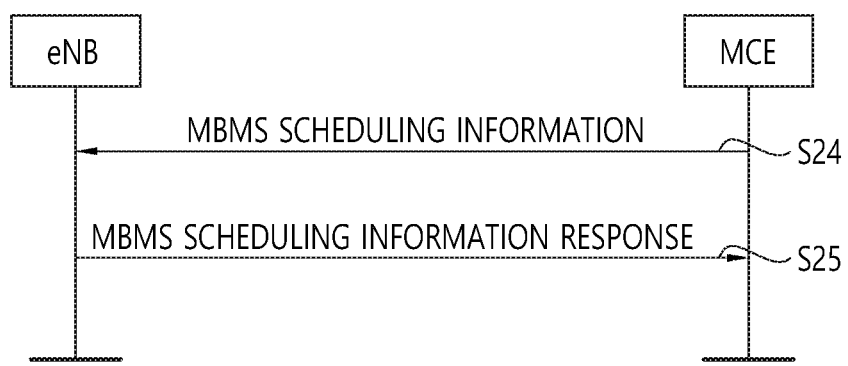
FIG. 7 illustrates MBMS scheduling information exchange.

FIG. 7 illustrates MBMS scheduling information exchange.

Referring to FIG. 7, the MCE provides MBMS scheduling information to a BS (S24).

The MCE, which manages multiplexing of the E-MBMS service, may determine which service is to be multiplexed with the MCH. Since a section of each E-MBMS service may be different, it is necessary to dynamically perform/manage service multiplexing. The MCE allocates an optimized amount of resources to multiplexed services. The MCE selects a CSA pattern for the MCHs and selects the order of the services appearing in the MCCH. MBSFN transmission is guaranteed by equally multiplexing services in cells belonging to the same MBSFN area. The MCE provides information, as MBMS scheduling information, related to the above-described process to the BS through the M2 interface.

The BS feeds back an MBMS scheduling information response to the MCE (S25).

Figure 8:
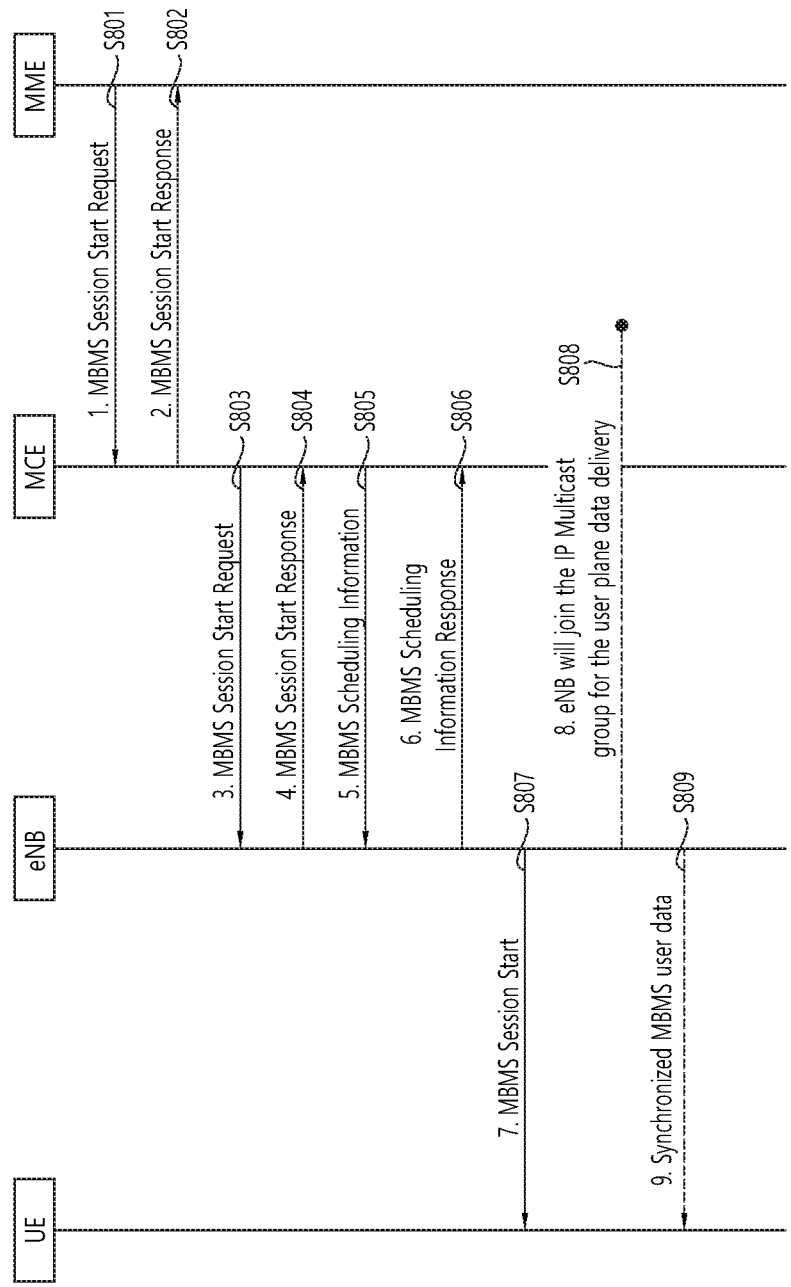
FIG. 8 illustrates an MBMS session start procedure.

FIG. 8 illustrates an MBMS session start procedure.

Referring to FIG. 8, the MME transmits an MBMS session start request message to a target MBMS MCE (S801). The message may include information such as an Internet protocol (IP) multicast address, session characteristics, minimum waiting time before initial data transmission, and the like.

The MCE determines whether there are sufficient radio resources for establishing a new MBMS service. If there is no sufficient resource, the MCE may determine not to establish a radio bearer of the MBMS service and does not deliver the MBMS session request message to the BS. Otherwise, the MCE acknowledge reception of the MBMS session start request message to the MME (S802).

The MCE transmits an MBMS session start request message to a BS (or eNB) in a target MBMS service area (S803).

The BS acknowledges reception of the MBMS session start request message (S804), and the MCE transmits to the BS an MBMS scheduling information message including updated MCCH information carrying MBMS service configuration information (S805).

The BS acknowledges reception of the MBMS scheduling information message (S806), and informs the UE about the start of the MBMS session by the updated MCCH information carrying MCCH change notification and the MBMS service configuration information (S807).

The BS joins an IP multicast group to receive MBMS user plane data (S808).

The BS transmits MBMS data through a wireless interface at a predetermined time (S809).

Figure 9:
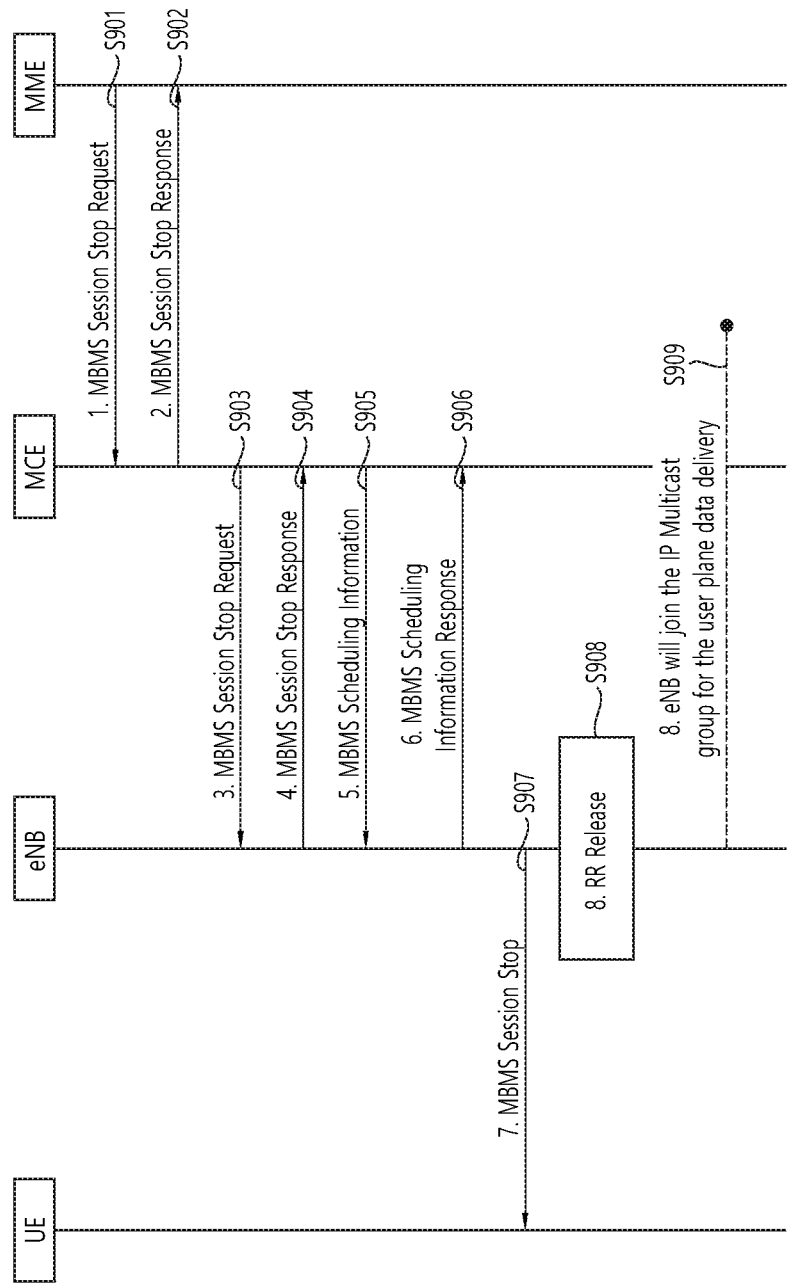
FIG. 9 illustrates an MBMS session stop procedure.

FIG. 9 illustrates an MBMS session stop procedure.

Referring to FIG. 9, the MME transmits an MBMS session stop request message to the MCE that controls the target BS of the MBMS service area (S901). The MCE acknowledges reception of the MBMS session stop request to the MME (S902).

The MCE transmits an MBMS session stop message to the target BS of the MBMS service area (S903) and the BS acknowledges reception of the MBMS session stop message to the MCE (S904).

The MCE transmits an MBMS scheduling information message including an updated MCCH message carrying the MBMS service configuration information to the BS (S905).

The BS acknowledges reception of the MBMS scheduling information message (S906) and the BS informs the terminal about the MBMS session stop by removing a certain service configuration associated with the stopped session from the updated MCCH message (S907).

The BS releases the corresponding E-RAB (S908) and leaves the IP multicast group (S909).

Figure 10:
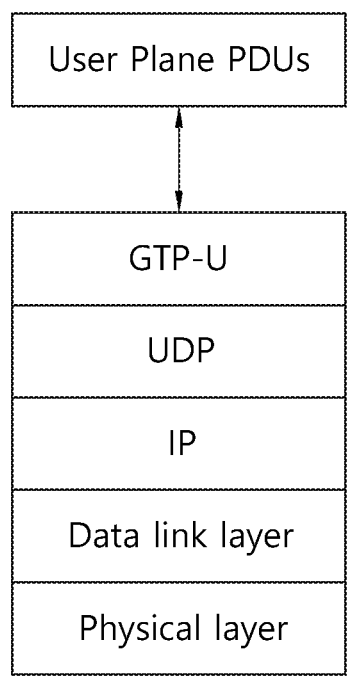
FIG. 10 illustrates an M1 user plane interface.

FIG. 10 illustrates an M1 user plane interface.

Referring to FIG. 10, the M1 user plane interface is defined between a BS and an MBMS gateway. The M1 user plane interface provides an unguranteed delivery of a user plane PDU between the BS and the MBMS gateways.

Figure 11:
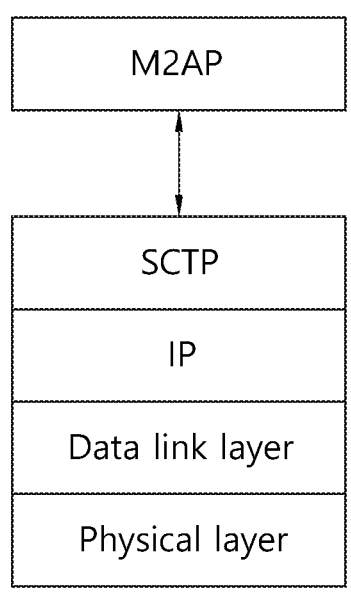
FIG. 11 illustrates an M2 control plane interface.

FIG. 11 illustrates an M2 control plane interface.

Referring to FIG. 11, the M2 control plane interface is defined between the BS and the MCE. A SCTP layer provides guaranteed delivery of an application layer message. Point-to-point transmission of the IP layer is used for transmission of the signaled PDU.

The M2 interface may provide an MBMS session control function, an MBMS scheduling information providing function, an M2 interface management function, an M2 setup function, an MBMS service counting function, an MBMS service stop/resume function, and the like.

Figure 12:
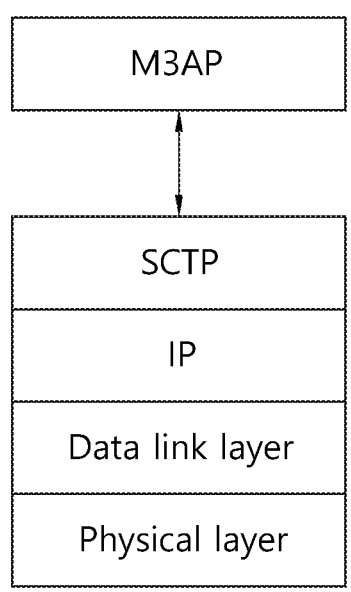
FIG. 12 illustrates an M3 control plane interface.

FIG. 12 illustrates an M3 control plane interface.

Referring to FIG. 12, the M3 control plane interface is defined between the MME and the MCE. The SCTP layer provides guaranteed delivery of an application layer message. The IP layer uses point-to-point transmission for delivery of the PDU to be signaled. The M3 interface provides functions such as an MBMS session processing function, an M3 interface management function, and an M3 setup function.

The MBMS counting may be used to determine whether there are sufficient UEs which are interested in receiving the service or whether it is appropriate to provide the service via the MBSFN. The MBMS counting may be applied only to the UEs in a connection mode. Whether MBSFN transmission is available may be implemented by an MBMS service stop and resumption function.

Hereinafter, the present invention will be described.

The proposed methods below propose a method for dynamically changing/operating a V2X message transmission related link adaptation parameter, as compared with the related art, when specific cell-related V2X messages are simultaneously transmitted (cooperatively) according to a predefined or signaled regulation. The link adaptation parameter may include at least one of modulation and coding scheme (MCS) information and frequency resource position/amount information, for example.

For example, when the proposed methods (or some of the proposed methods) are applied, the V2X message transmission related dynamic link adaption parameter may be changed in consideration of a (relatively dynamically) time-varied link quality/interference level, a V2X traffic load, and the like, rather than a (link adaption parameter) modification operation through the existing MCCH modification period and/or notification mechanism.

Hereinafter, the present invention provides a method and apparatus for dynamically changing a V2X message transmission related link adaptation parameter.

Figure 13:
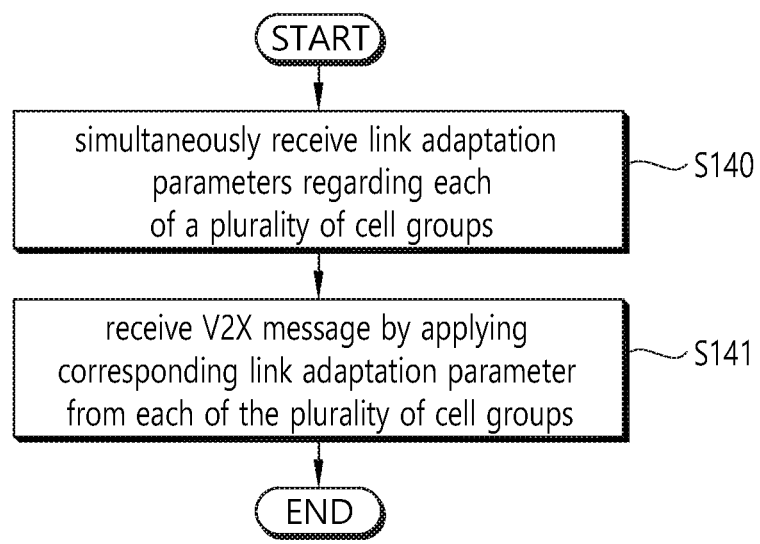
FIG. 13 illustrates a V2X message communication method performed by a UE in a wireless communication system according to [proposed method #1] of the present invention.

FIG. 13 illustrates a V2X message communication method performed by a UE in a wireless communication system according to [proposed method #1] of the present invention.

Referring to FIG. 13, the UE simultaneously receives link adaptation parameters regarding a plurality of cell groups (S140).

The link adaptation parameter regarding each cell group of the plurality of cell groups may include at least one of modulation and coding scheme (MCS) information of a V2X message transmitted by the one cell group and frequency resource information.

The link adaptation parameter may be received through a predetermined search space among a common search space (CSS) and a UE-specific search space (USS).

The DCI format may be decoded on the basis of a predetermined radio network temporary identifier (RNTI).

The DCI format may include a field for indicating the number of the plurality of cell groups. The DCI format may include a field for indicating an ID of a cell group for each of the plurality of cell groups, an MCS for a V2X message transmitted in a cell group indicated by the ID, and information indicating a frequency resource to which the V2X message is allocated.

Alternatively, the link adaptation parameter may be received via a data channel scheduled according to a predetermined DCI format.

The UE receives the V2X message by applying the corresponding link adaptation parameter from each of the plurality of cell groups (S141).

When the plurality of cell groups include a first cell group and a second cell group, a V2X message may be received from the first cell group in a first subframe, and a V2X message is received from a first cell group in a second subframe, which is a next subframe of the first subframe. Here, the V2X message received from the first cell group may be decoded by a first MCS, and the V2X message received from the second cell group may be decoded by a second MCS. The first MCS may be indicated via a link adaptation parameter for the first cell group and the second MCS may be indicated via a link adaptation parameter for the second cell group.

Hereinafter, [proposal method #1] will be described in detail.

[Proposed method #1] The V-UE #K may be configured to perform blind decoding on a PDCCH (/DCI) including pieces of information described below or perform blind decoding on a PDCCH (/DCI) scheduling a PDSCH including pieces of information described below on the basis of a new RNTI (which may also be called a V2X-RNTI) which is previously defined or signaled.

Through blind decoding on the PDCCH (/DCI), a V-UE #K may be simultaneously dynamically signaled about V2X message transmission related link adaptation parameters (e.g., at least one of MCS information and frequency resource position/amount information) of a plurality of cell groups (or MBSFN areas) to be monitored by the V-UE #K.

The DCI format for this purpose may be defined to have the same size as a predefined or signaled specific DCI format (e.g., DCI format 1C) to avoid an additional increase in the number of blind decodings.

The DCI format may be defined to be transmitted based on a predefined or signaled specific search space (SS) and/or a specific aggregation level (AL). For example, the DCI format may be transmitted in a common search space (CSS) or a UE-specific search space (USS).

When the plurality of cell groups (or MBSFN areas) is named as one MBSFN area set (or a cell group set), the V2X-RNTI may be configured or signaled for each MBSFN area set (or cell group set).

Figure 14:
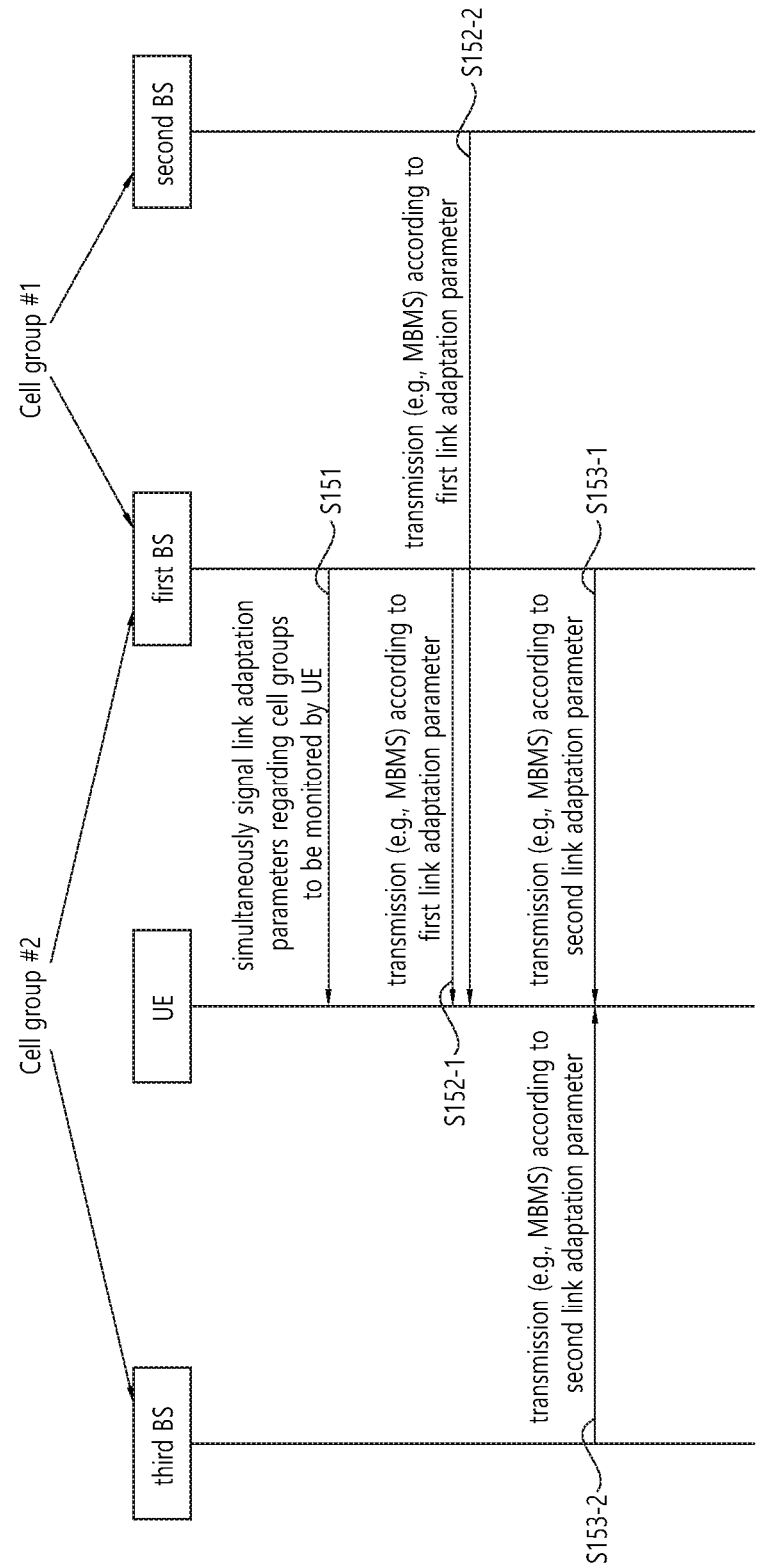
FIG. 14 illustrates a specific example of applying [proposed method #1].

FIG. 14 illustrates a specific example of applying [proposed method #1].

Referring to FIG. 14, a first BS and a second BS may belong to cell group #1, and the first BS and a third BS may belong to cell group #2.

The first BS simultaneously signals link adaptation parameters for cell groups that the UE should monitor (S151). For example, it may be assumed that the first BS is a serving cell (e.g., when the UE is in an RRC connected mode with the first BS) or a camping cell (e.g., when the UE is in an (RRC) idle mode). For example, the first BS may provide the UE with a link adaptation parameter for the cell group #1 and a link adaptation parameter for the cell group #2 together Thereafter, the first BS and the second BS, that is, the BSs belonging to the cell group #1, transmit a V2X message according to the first link adaptation parameter to the UE in A first subframe (S152-1, S152-2).

Thereafter, for example, in the second subframe, the BSs that belong to the first BS and the third BS, that is, the BSs that belong to the cell group #2, transmit the V2X message according to the second link adaptation parameter to the UE (S153-1, S153-2).

A plurality of cell sets performing the V2X message transmission operation at the same time for each of predefined or signaled time resource units (for example, subframes) may be configured to be different.

Figure 15:
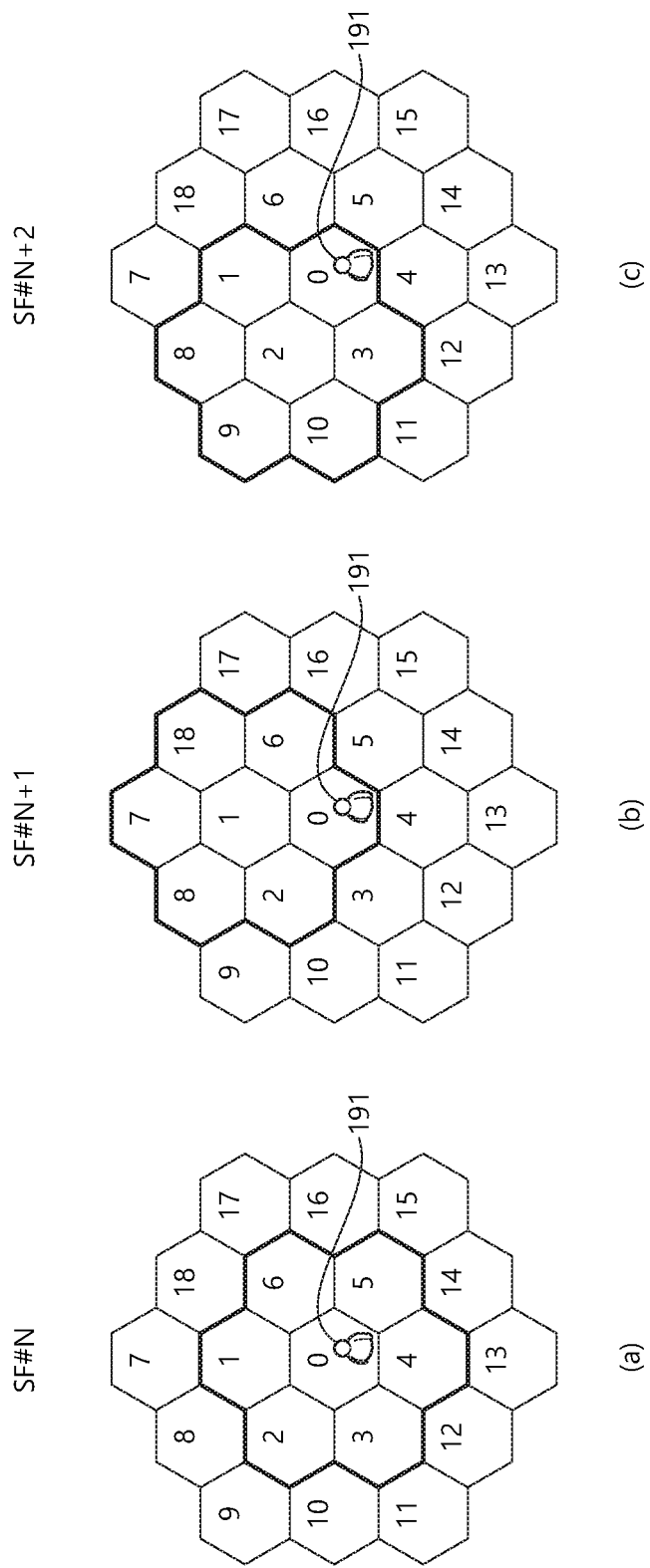
FIGS. 15 to 17 illustrate an example of a case where a vehicle UE #K (V-UE #K, 191) located in the coverage of cell #0 (or RRC-connected with cell #0) simultaneously receive specific cell-related V2X messages from a plurality of cells by predefined or signaled time resource units.
Figure 16:
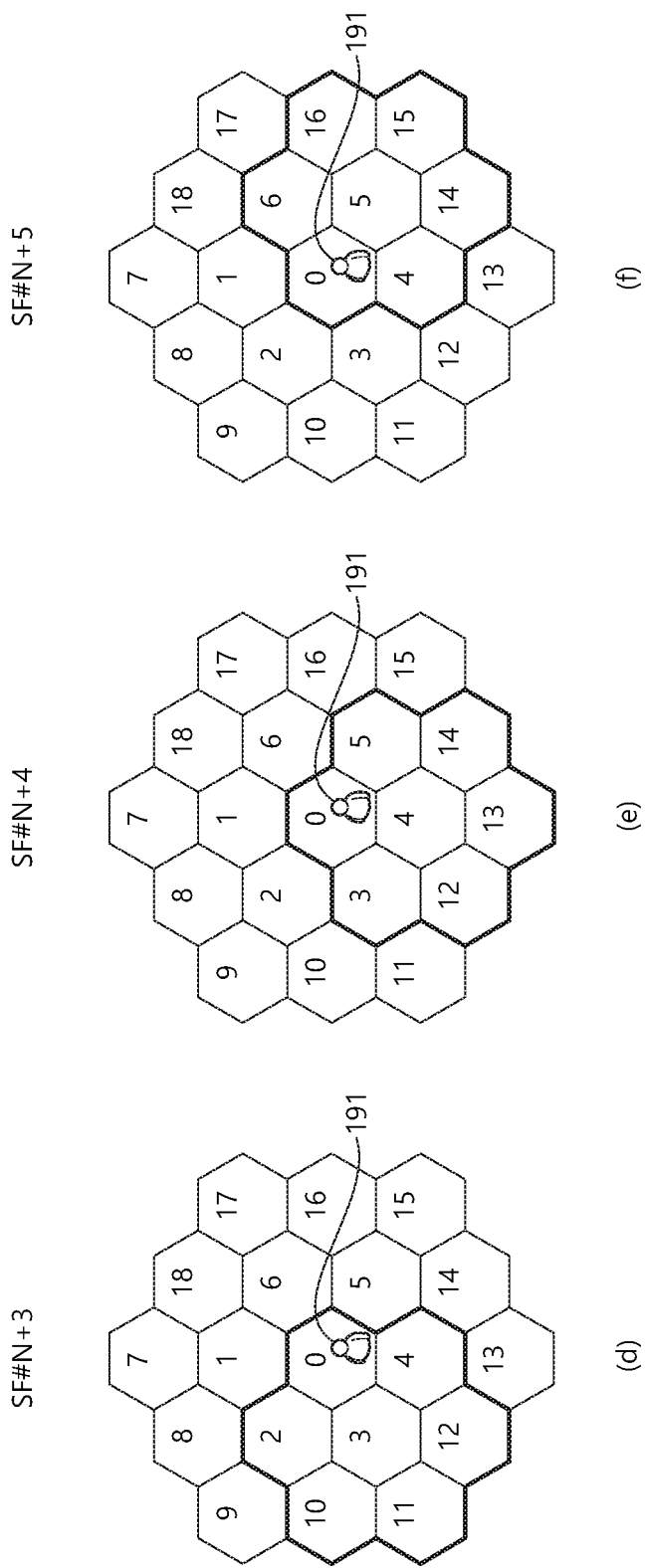
Figure 17:
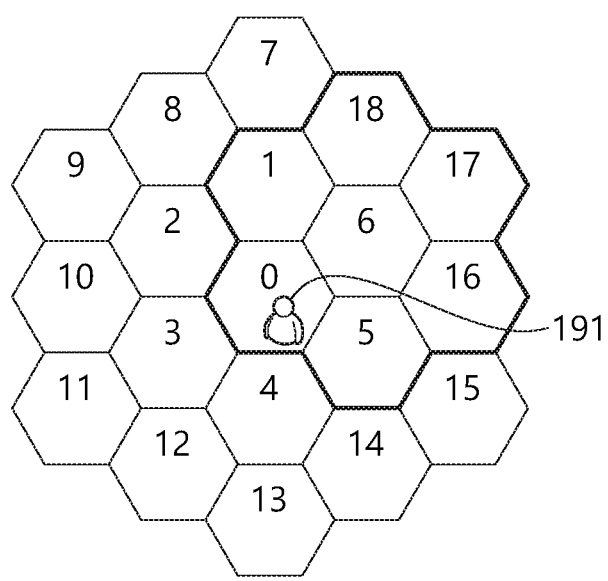

FIGS. 15 to 17 illustrate an example of a case where a vehicle UE #K (V-UE #K, 191) located in the coverage of cell #0 (or RRC-connected with cell #0) simultaneously receive specific cell-related V2X messages from a plurality of cells by predefined or signaled time resource units.

Referring to FIG. 15A, the V-UE #K 191 simultaneously receives a cell #0 related V2X message in a subframe #N from cells #0/1/2/3/4/5/6 (referred to as a cell #0), and referring to FIG. 16B, the V-UE #K 191 simultaneously receives a cell #1 related V2X message in a subframe #(N+1) from cells #0/1/2/6/7/8/18 (referred to as a cell group #1). Referring to FIG. 15C, the V-UE #K 191 simultaneously receives a cell #2 related V2X message in the subframe #(N+2) from the cells #0/1/2/3/8/9/10 (which will be referred to as a cell group #2).

Referring to FIG. 16A, the V-UE #K 191 simultaneously receives a cell #3 related V2X message in a subframe #(N+3) from cells ##0/2/3/4/10/11/12 (referred to as a cell group #3), referring to FIG. 16B, the V-UE #K 191 simultaneously receives a cell #4 related V2X message in a subframe #(N+4) from cells #0/3/4/5/12/13/14 (referred to as cell group #4), and referring to FIG. 16C, the V-UE #K 191 simultaneously receives a cell #5 related V2X message in a subframe #(N+5) from cells #0/4/5/6/14/15/16 (referred to as cell group #5).

Referring to FIG. 17, the V-UE #K 191 simultaneously receives a cell #6 related V2X message in a subframe #(N+6) from cells #0/1/5/6/16/17/18 (referred to as cell group #6).

In FIGS. 15 to 17, the term of cell group may be interpreted as an MBSFN area and the cell groups #0/1/2/3/4/5/6 may be regarded as seven MBSFN areas (i.e., MBSFN areas #0/1/2/3/4/5/6) to which the cell #0 belongs.

In FIGS. 15 to 17, it may be assumed that all cell groups (or MBSFN areas) are matched in related time/frequency synchronization or that a time/frequency synchronization difference is smaller than a predefined or signaled threshold.

Meanwhile in FIGS. 15 to 17, the V-UE #K receives a V2X message from one MBSFN area set #X (or cell group set #X) including MBSFN areas #0/1/2/3/4/5/6. Here, the V-UE #K may perform decoding (e.g., blind decoding) on a PDCCH (/DCI) including at least one of the pieces of information below or perform decoding (e.g., blind decoding) on a PDCCH (/DCI) scheduling a PDSCH including at least one of pieces of information below on the basis of a predetermined or signaled V2X-RNTI #X interworking with the MBSFN area set #X (or cell group set #X).

FIG. 18 is an example of a PDCCH/DCI decoded based on the V2X-RNTI or a field/information configuration on the PDCCH/DCI decoded based on the V2X-RNTI. FIG. 18 is an example in which the first BS simultaneously provides link adaptation parameters for a plurality of cell groups in FIGS. 13 and 14.

Referring to FIG. 18, the PDCCH/DCI decoded based on the V2X-RNTI includes information on the number of cell groups to which the V-UE #K belongs and a link adaptation parameter determined for each cell group (or MBSFN area).

The link adaptation parameter includes at least one of a field for indicating an identity of a cell group, a field for indicating an MCS for a V2X message transmitted in a cell group indicated by the ID, and information indicating a frequency resource to which the V2X message is allocated, for example.

In FIG. 18, for the purposes of description, it is assumed that only the information related to (Example #1) and (Example #2) described below are transmitted via a predefined physical layer channel (e.g., PDCCH (/DCI), PDSCH).

In order to obtain the above information, the subframe time/position information to be subjected to (blind) decoding of a physical layer channel based on the V2X-RNTI may be signaled through a bitmap having a size of "6 (MBMS subframe)*(share obtained by dividing a period at which V2X-RNTI-based physical layer channel blind decoding is performed by '10')" or "6 (MBMS subframe)*(share obtained by dividing a period at which a V2X message transmission related link adaptation parameter of a cell (or MBSFN area) is updated by '10')".

The subframe time/position information may be signaled to the V-UE #K through the MCCH transmitted from the network (or cell #0). For example, if a period at which (blind) decoding of a predefined (/MCCH)-signaled V2X RNTI-based physical layer channel is to be performed (or a period at which the V2X message transmission related link adaptation parameter of a (predefined (/MCCH) signaled) cell group/MBSFN area) is '20 ms', a bitmap having a 12-bit size may indicate whether the corresponding blind decoding is sequentially performed in the other remaining subframes, excluding subframes #0/4/5/9/10/14/15/19 (FDD system) on two contiguous radio frames.

As a further example, the subframe time/position at which the (blind) decoding of the V2X-RNTI-based physical layer channel is to be performed may be implicitly defined by a total of Q number of (predefined (/MCCH)-signaled) (MBMS) subframes in ascending (or descending) order direction of a first (and/or last) (MB SM) subframe or a subframe index including the first (or last) (MBMS) subframe on a period at which the V2X message transmission related link adaptation parameter of the period at which the V2X-RNTI-based physical layer channel (blind) decoding is to be performed is updated or on a predefined (/MCCH)-signaled) MCS(/link adaptation parameter) modification period.

Alternatively, in FIG. 18, a field position (/index) in which a specific cell group (or MBSFN area)-related link adaptation parameter (e.g., at least one of MCS information and frequency resource position/amount information) may be defined by the remainder obtained by dividing the cell group (or MBSFN area) ID (/index) by the total number of the fields in which the link adaptation parameter is transmitted.

The corresponding link information may be signaled to the V-UE #K through the MCCH transmitted from the network (or cell #0).

(Example #1) At least one of information regarding the number of cell groups (or MBSFN areas) to which the cell (i.e.,cell #0) of the V-UE #K belongs and an ID (/index) of the cell group (or MBSFN area) to which the cell (i.e., cell #0) of the V-UE #K belongs and information of an MBSFN area set (or cell group set) to be received by the V-UE #K may be transmitted on the PDCCH/DCI decoded based on the V2X-RNTI or on the PDSCH scheduled by the PDCCH/DCI decoded based on the V2X-RNTI.

(Example #2) A link adaptation parameter, for example, MCS information and/or frequency resource location/amount information for each cell group (or MBSFN area) designated through (Example #1) may be transmitted on the PDCCH/DCI decoded based on the V2X-RNTI or on the PDSCH scheduled by the PDCCH/DCI to be decoded based on the V2X-RNTI.

(Example #3) MCH (multicast channel) scheduling information may be transmitted on the PDCCH/DCI decoded based on the V2X-RNTI or on the PDSCH scheduled by the PDCCH/DCI to be decoded based on the V2X-RNTI.

As another example, some or all of the channels through which the above-described information (for example, the information described in (Example #1), (Example #2), (Example #3)) may be defined to be different.

In one example, the information of (Example #1) may be transmitted through a channel through which system information is transmitted, and the information related to (Example #2) (and/or (Example #3)) may be transmitted through the PDCCH/DCI (blind) decoded by the V2X-RNTI or through the PDSCH scheduled by the PDCCH/DCI (blind) decoded by the V2X-RNTI.

When such a rule is applied, payload or information amount required to be transmitted may be offloaded to a plurality of channels to increase a reception success probability.

[Proposed method #2] In [proposed method #1], at least one of the information related to (Example #1), (Example #2), and (Example #3) may be signaled in the form of MAC CE (control element). For example, the corresponding MAC CE may be delivered through the PDSCH scheduled by the PDCCH (/DCI) (blind) decoded by the V2X-RNTI. In addition, this new MAC CE-related LCID (logical channel ID) information may be previously signaled from the network (or from cell #0) or fixed to a specific value.

In another example, an MBSFN (area) (or cell group) ID (/index) is not directly included (/signaled) but indirectly expressed (/signaled) on the PDCCH (/DCI) ((blind-decoded) by the V2X-RNTI) (or on the PDSCH scheduled by the PDCCH(/DCI) (blind)-decoded by the V2X-RNTI). Here, for example, predefined information (e.g., TMGI or service ID, etc.) is included (in other words) (on the PDCCH (/DCI) ((blind-decoded by the V2X-RNTI) (or on the (PDSCH scheduled by the PDCCH (/DCI) (blind)-decoded by the V2X-RNTI)), and the corresponding information may be configured (/signaled) in linkage with MBSFN (area) (or cell group) ID (/index) (or cell position) information, and when this information is received, the UE may recognize a cell group (or MBSFN (area))/position information, and the like, in which the V2X message is generated (and/or ((downlink broadcast) transmitted).

The V2X UE may determine an MBSFN area set (or a cell group set) to be received based on its own location, or may directly set (/signal) it from the network.

In determining the MBSFN area set (or cell group set) in which the V2X UE is to receive the V2X message, the V2X UE may use the MBSFN area set (or cell group set) configuration information broadcast by the network.

For example, one MBSFN area set (or cell group set) configuration information may include at least one of an MBSFN area set (or cell group set) identifier, a corresponding V2X-RNTI value, and a V2X UE position information corresponding to the MBSFN area set (or cell group set).

The network may broadcast the MBSFN area set (or cell group aggregation) configuration information for a plurality of MBSFN area sets (or cell group sets). The V2X UE may receive the V2X message using one or more MBSFN area set (or cell group set) configuration information corresponding to its location.

The MBSFN area set (or cell group set) configuration information may be broadcast through system information. The location information of the V2X UE may include at least one of location information (for example, GPS information) of an application level of the V2X UE, movement direction information of the V2X UE, and speed information of the V2X UE.

The V2X UE may report its location information to the network periodically or when predefined (/signaled) certain conditions are met. The network may determine an MBSFN area set (or cell group set) to be received by the V2X UE based on the reported location of the V2X UE and transmit a corresponding MBSFN area set (or cell group set) configuration information via a dedicated signal or a broadcast signal.

Alternatively, the network may transmit only an identifier of the corresponding MBSFN area set (or cell group set). In this case, the V2X UE may receive the V2X message using only the MBSFN area set (or cell group set) configuration information corresponding to the received identifier of the MBSFN area set (or cell group set).

The MBSFN area set (or cell group set) configuration information and the MBSFN area set (or cell group set) identifier information selected based on the location of the V2X UE may be transmitted to the V2X UE through RRC (/broadcasting) signaling or MAC CE.

The location reporting period may be set (/signaled) from the network, and the V2X UE may scale based on its own speed. For example, if the speed is greater than a preset (/signaled) threshold, the set(/signaled) period may be scaled to a smaller value to report the location more frequently.

If the V2X UE is in the RRC idle state at a time when the location information is to be reported, the V2X UE may attempt RRC connection to report the location information. The location information of the V2X UE may include at least one of location information (for example, GPS information) of an application level of the V2X UE, movement direction information of the V2X UE, and speed information of the V2X UE.

The aforementioned embodiments of the present invention may be included as one of methods of implementing the present invention and thus regarded as proposed methods. In addition, the aforementioned proposed methods may be independently implemented or some proposed methods may be combined or merged. Although the present invention has been described based on the 3GPP LTE/LTE-A system for the purposes of description, the scope of the system to which the proposed method is applied may extend to other systems in addition to the 3GPP LTE/LTE-A system. The proposed methods of the present invention may also extend for D2D communication. D2D communication refers to that a UE communicates directly with another UE using a wireless channel.

A UE refers to a user terminal, but when a network equipment such as a BS transmits/receives a signal according to a communication method between terminals, the network equipment may also be regarded as a terminal.

The proposed methods of the present invention may also be limitedly applied only to mode 2 V2X operation (and/or mode 1 V2X operation).

Further, the proposed methods of the present invention may extend not only to vehicle terminals but also to pedestrian UEs (P-UEs). In addition, the proposed methods of the present invention may extend not only to a UU-based V2V scenario but also to a UU-based (or PC5-based) V2I scenario.

Also, the proposed methods of the present invention may extend to all cases where a plurality of cells coordinate to transmit/broadcast a V2X message at the same time.

Figure 19:
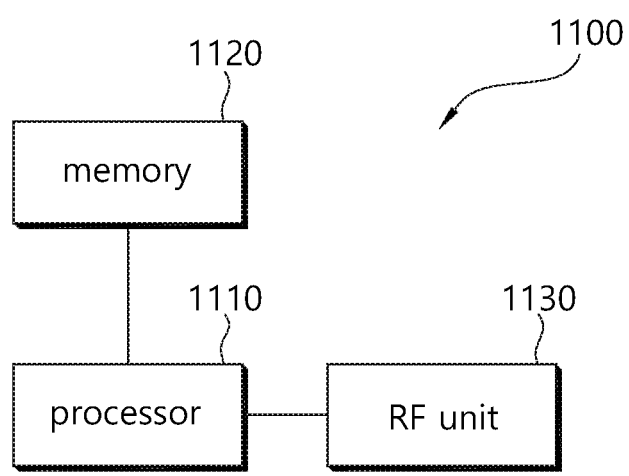
FIG. 19 is a block diagram illustrating a UE in which an embodiment of the present invention is implemented.

FIG. 19 is a block diagram illustrating a UE in which an embodiment of the present invention is implemented.

Referring to FIG. 19, a UE 1100 includes a processor 1110, a memory 1120, and a radio frequency (RF) unit 1130.

According to an embodiment, the processor 1110 may perform the functions/operations/methods described in the present invention. For example, the processor 1110 may simultaneously receive link adaptation parameters for a plurality of cell groups and apply a corresponding link adaptation parameter from each of the plurality of cell groups to receive a V2X message.

The RF unit 1130 is connected to the processor 1110 to transmit and receive radio signals.

The processor may comprise an application-specific integrated circuit (ASIC), other chipset, logic circuitry and/or data processing device. The memory may include read-only memory (ROM), random access memory (RAM), flash memory, memory cards, storage media, and/or other storage devices. The RF unit may include a baseband circuit for processing the radio signal. When the embodiment is implemented in software, the above-described techniques may be implemented with modules (processes, functions, and so on) that perform the functions described above. The module may be stored in the memory and may be executed by the processor. The memory may be internal or external to the processor, and may be coupled to the processor by various well known means.

What is claimed is:

1. A method for performing vehicle-to-everything (V2X) message communication method performed by a user equipment (UE) in a wireless communication system, the method performed by a user equipment (UE) and comprising:
   transmitting location information informing a location of the UE to a network,
   receiving a downlink control information (DCI) format including link adaptation parameters related to a plurality of cell groups in a decoding subframe;
   wherein each of the plurality of cell groups includes a cell on which the UE camps; and
   receiving, from a cell group among the plurality of cell groups, a V2X message based on a link adaptation parameter among the link adaptation parameters related to the cell group,
   wherein the decoding subframe is determined based on a transmission period for updating the link adaptation parameters,
   wherein the plurality of cell groups are determined based on the location of the UE,
   wherein the UE transmits the location information and movement direction information periodically, and
   wherein the transmission period for the location information is determined based on a velocity of the UE.

2. The method of claim 1, wherein the link adaptation parameter for one of the plurality of cell groups includes modulation and coding scheme (MCS) information and frequency resource information of the V2X message transmitted from the one of the plurality of cell groups.

3. The method of claim 1, wherein the DCI format is a predetermined downlink control information (DCI) format.

4. The method of claim 3, wherein the DCI format is received through a predetermined search space among a common search space (CSS) and a UE-specific search space (USS).

5. The method of claim 3, wherein the DCI format is decoded based on a predetermined radio network temporary identifier (RNTI).

6. The method of claim 3, wherein the DCI format includes a field informing a number of the plurality of cell groups.

7. The method of claim 3, wherein the DCI format includes at least one of a field informing an identity (ID) of a cell group, a field informing an MCS regarding the V2X message transmitted from the cell group informed by the ID, or information informing a frequency resource to which the V2X message is allocated, regarding each of the plurality of cell groups.

8. The method of claim 1, wherein based on the plurality of cell groups including a first cell group and a second cell group, a V2X message is received from the first cell group in a first subframe and a V2X message is received from the second cell group in a second sub-frame as a next subframe of the first subframe.

9. The method of claim 8, wherein the V2X message received from the first cell group is decoded by a first MCS, and the V2X message received from the second cell group is decoded by a second MCS.

10. The method of claim 9, wherein the first MCS is informed through the link adaptation parameter regarding the first cell group, and the second MCS is informed through the link adaptation parameter regarding the second cell group.

11. A user equipment comprising:
   a transceiver for transmitting and receiving a radio signal; and
   a processor combined with the transceiver to operate, wherein the processor is configured for:
      transmitting location information informing a location of the UE to a network,
      receiving a downlink control information (DCI) format including link adaptation parameters related to a plurality of cell groups in a decoding subframe;
      wherein each of the plurality of cell groups includes a cell on which the UE camps; and
      receiving, from a cell group among the plurality of cell groups, a V2X message in based on a link adaptation parameter among the link adaptation parameters related to the cell group,
      wherein the decoding subframe is determined based on a transmission period for updating the link adaptation parameters,
      wherein the plurality of cell groups are determined based on the location of the UE,
      wherein the UE transmits the location information and movement direction information periodically, and
   wherein the transmission period for the location information is determined based on a velocity of the UE.

* * * * *